United States Patent [19]
Gabano et al.

[11] 3,871,917
[45] Mar. 18, 1975

[54] NEGATIVE ACTIVE SUBSTANCE FOR A STORAGE CELL

[75] Inventors: Jean-Paul Gabano; Yves Jumel, both of Poitiers, France

[73] Assignee: Saft-Societe Des Accumulateurs Fixes Et De Traction, Romainville, France

[22] Filed: June 11, 1973

[21] Appl. No.: 368,866

[30] Foreign Application Priority Data
June 9, 1972  France .............................. 72.20843
June 9, 1972  France .............................. 72.20844
Nov. 23, 1972 France .............................. 72.41702

[52] U.S. Cl. ................................................ 136/26
[51] Int. Cl. ........................................ H01m 39/00
[58] Field of Search ................ 136/26, 27, 20, 120; 117/127, 228, 230

[56] References Cited
UNITED STATES PATENTS

| | | | |
|---|---|---|---|
| 3,043,896 | 7/1962 | Herbert et al. .................. | 136/6 L N |
| 3,265,535 | 8/1966 | Sundberg .......................... | 136/26 X |
| 3,480,479 | 11/1969 | Nestor ............................... | 136/86 D |
| 3,481,790 | 2/1969 | Duddy ............................... | 136/26 X |
| 3,492,164 | 1/1970 | Wolfe, Jr. .......................... | 136/86 D |
| 3,505,118 | 4/1970 | Mehra et al. ...................... | 136/86 D |
| 3,532,545 | 10/1970 | Babusri et al. .................... | 136/13 X |
| 3,607,408 | 9/1971 | Duddy ............................... | 136/26 |
| 3,644,145 | 2/1972 | Fraioli et al. ...................... | 136/83 R X |
| 3,764,380 | 10/1973 | Grossman ......................... | 136/26 X |
| 3,788,898 | 1/1974 | Yarnell .............................. | 136/27 |

Primary Examiner—John H. Mack
Assistant Examiner—C. F. Lefevour
Attorney, Agent, or Firm—Kenyon & Kenyon Reilly Carr & Chapin

[57] ABSTRACT

The negative active material for a storage cell having an acid electrolyte, whose positive is constituted by the electrochemical system $PbO_2/H_2SO_4/PbSO_4$ is composed of molybdenum oxides such that the average value of the valency be comprised between 4 and 6. The oxides concerned are, more particularly, mixed oxides of $MoO_2$ and $MoO_3$. The oxygen reducing system thus obtained may be as follows:

$$MoO_3 \cdot 4\ MoO_2 + 2H^+\ 2e\ \underset{\text{discharge}}{\overset{\text{charge}}{\rightleftarrows}}\ 5\ MoO_2 + H_2O;$$

The corresponding storage cell is characterized by a very low sulphuric acid consumption on discharging and increased stability of the capacity during the idle periods of the storage cell in the charged state. It is recommended to compress the active material before assembly and to apply compression on operation to prevent that substance from disintegrating and scattering.

30 Claims, 11 Drawing Figures

NEGATIVE ACTIVE SUBSTANCE FOR A STORAGE CELL

RELATED APPLICATIONS

No related applications are pending.

BACKGROUND OF THE INVENTION

The invention concerns an active material for the negative electrode of a storage cell having an acid electrolyte, whose positive electrode is preferably constituted by the electrochemical system $$PbO_2/H_2SO_4/PbSO_4$$

It concerns also a negative electrode consisting basically of such an active material, a storage cell comprising such an electrode, a method of manufacturing the said negative active material, as well as operating process for that active material.

Conventional lead type accumulators having an acid electrolyte constituted by a sulphuric acid solution are characterized by a positive active substance which varies between lead dioxide in the charged state and lead sulphate in the discharged state and by a negative active substance which varies between lead in the charged state and lead sulphate in the discharged state.

In other words, the active substances in the charged state (lead and lead dioxide) need a certain quantity of sulphuric acid which they fix, to become lead sulphate in the discharged state. The oxidation-reduction reactions at the positive and negative electrodes have, respectively, the form:

$$PbO_2 - SO_4^{2-} + 4H^+ 2e \rightleftharpoons PbSO_4 + 2H_2O \quad (1)$$

$$PbSO_4 + 2e \rightleftharpoons Pb + SO_4^{2-} \quad (2)$$

where $e$ represents an electron.

The overall charge and discharge reaction may consequently be written:

$$PbO_2 + Pb + 2H_2SO_4 \underset{charge}{\overset{discharge}{\rightleftharpoons}} 2\,PbSO_4 + 2H_2O \quad (3)$$

It is seen, therefore, that the discharge operation requires the supplying, to the active substances, of 2 moles of sulphuric acid for 2 Faradays, that quantity of sulphuric acid being restored during charging. Simultaneously, an enriching of 2 moles of water occurs.

Two disadvantages results therefrom:

Near the end of the discharge, the electrolyte must still be sufficiently conductive despite the depletion in sulphuric acid and the enriching in water which occurs, this necessitating a certain extra quantity of sulphuric acid, which is absolutely necessary for operation in order to ensure sufficient conductivity;

That extra quantity of sulphuric acid in the electrolyte must be as great as possible to avoid disturbances which are too great in the conductivity of the electrolyte between the charge and the discharge.

There is also, another disadvantage, due to the fact that the negative active material, in the state of lead metal when it is in the charged state, does not have a sufficient over-voltage to prevent it from displacing the hydrogen by reacting on the water. This has the effect of causing water consumption during the idle periods of the storage cell in the charged state and of causing correlative loss of capacity in the negative electrode. This causes an unbalance between the charged state of the two electrodes at the instant of their further charging, this having the effect of forming, prematurely, oxygen which, contained in the dissolved state, could be detrimental to the efficiency of the charge of the negative electrode.

An attempt has moreover been made to overcome the particular disadvantage of a reaction of lead on the elctrolyte constituting the negative active substance in the charged state by replacing the lead by copper which has a more favorable hydrogen over-voltage, this practically cancelling the losses in capacity during idle periods (see U.S. Pat. No. 2,269,040 by Rublee, for example). Nevertheless, the disadvantage of correlative sulphuric acid consumption upon the discharge of the negative electrode has not foreasmuch been cancelled, since that new negative active material has varied between copper and copper sulphate. But a further disadvantage has arisen, namely that the copper operates like an electrode of the first type, that is, its oxidized phase is soluble in the elctrolyte, forming, precisely, copper sulphate. Now, it is known that electrodes of the first type require fairly complicated and not very effective implementing preparations to attain a very long service life measured by the number of charge and discharge cycles.

An attempt has, moreover, been made to produce a sealed storage cell with an acid electrolyte. The problem of producing a storage cell capable of operating in a fluid-tight manner sets two fundamental conditions. The first consists in preventing the forming of hydrogen during the charge, during idle periods and during the discharge. The aim of the second is to establish an oxidation-reduction system $O_2/H_2/O$ in an acid medium, formed by oxygen, in order to ensure the necessary exchange of coulombs, mainly at the end of the charge and the over-charge. Indeed, the oxygen which then is evolved on the positive electrode (which acts as an anode) by oxidation of water providing electrons for the outside circuit, must be reduced on the negative electrode, which is then the cathode, by fixing the electrons coming from the said outside circuit.

SUMMARY OF THE INVENTION

The present invention is intended to overcome certain of these disadvantages and to attenuate the others.

The following description will be based on a genralized notion of the valency consisting in considering the value of the valencies scaled down to one atom of metal in a compound which comprises several thereof, each atom of metal being able to have a usual valency value expressed by a interger number. That notion is particularly useful to define the overall degree of oxidation or reduction of a mixed oxide of the type $A.M_aO_x.-B.M_bC_y$, for example. The average value of the valencies of that oxide is then expressed by the number $[2(Ax+By)/(Aa+Bb)]$ which may be an improper fraction number or a whole number.

The present invention consists in producing and using a new negative active substance. That substance is characterized in that it varies between the charged state and the discharged state in the form of oxides which are insoluble in the highly acid electrolyte without going through the metal phase and without going through the sulphate phase, hence without bringing sulphuric acid consumption into play to reach the discharged state.

According to the invention, the above-mentioned oxides constituting the negative active material are simple or mixed molybdenum oxides, such that the average value of the valency of the latter be greater than or equal to four and less than six.

According to another particularity of the invention, the average value of the valency of molybdenum in such oxides varies from the value 4 when the oxide is in the most reduced state, that is, in the charged state and when its composition could be illustrated by the formula $MoO_2$ to a value comprised between 4 ⅓ and 4 ½ corresponding to the oxide in the discharged state, that is, in the most oxidized state, it being possible to illustrate this respectively by formulas $MoO_3.5MoO_2$ and $MoO_3. 3MoO_2$.

According to yet another particularity of the invention, the molybdenum of the oxide in the above-mentioned negative active substance when it is in the discharged state has an average value of the valency equal to about 4.4, it being possible to illustrate this by the formula $MoO_3.4MoO_2$.

The oxidation-reduction system may also be represented by $MoO_m/MoO_n$ with a view to giving a mode of presentation of the operating reactions of the negative electrode on the one hand and of the corresponding storage cell on the other hand. The value of m is less than the value of n when the oxide $MoO_m$ represents the reduced phase. In one embodiment of the invention, the value of m is practically equal to 2 and that of n to 2.2. The corresponding oxidation-reduction system operating in an acid medium is equivalent to the system:

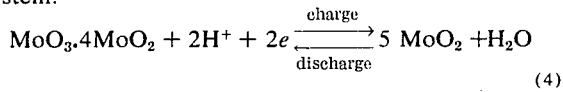

(4)

This oxide reducing system has the advantage of operating both when charging and when discharging between two molybdenum oxides at least one of which is a mixed oxide, hence without going through the metal phase. That system also has, in the reduced state, a hydrogen over-voltage which is sufficient to prevent its oxidation by the chemical action of water, this having the effect of preventing the forming of hydrogen during the idle periods of the storage cell. The result thereof is hence a remarkable stability, in a open circuit, of the negative active substance according to the invention, whereas this was not the case when the negative active material was constituted by divided lead.

It should be stated that the recommended active substance, which consists basically of lower oxides of molybdenum, has particularly suitable characteristics for fluid-tight operation of the correspondent storage cells. It is therefore the use of that negative active substance which constitutes the fundamental base enabling the producing of storage cells having an acid electrolyte, operating in a fluid-tight manner.

The principle for the method of manufacturing that negative acitve material consists, starting with molybdenum trioxide, in reducing it electrochemically in a sulphuric acid solution until hydrogen is truly given off and in using it subsequently as a negative active material.

It is then observed, on passing from $MoO_3$ to $MoO_2$, the final state of the reduction, that there are two transformation stages, the first, which is by far the greatest, being at a pproximately − 5,000 mV in relation to a reference electrode consisting of mercury sulphate $Hg/Hg_2SO_4/SO_4^{2-}$ and the other, clearly the smaller, being at approximately − 800 mV in relation to the same reference electrode. The passing from one stage to the other corresponds to a composite molybdenum oxide whose composition is comprised between that of the mixed oxides represented by the formulas $MoO_3$. $3MoO_2$ and $MoO_3$. $5MoO_2$, that is, by the formulas $MoO_{2.25}$ and $MoO_{2.17}$. It may also be observed that the corresponding product varies in a reversible way between that intermediate composite oxide and the oxide $MoO_2$, along the second state which is more electronegative and hence that this oxidation-reduction system which may be represented by $MoO_{2.17}/MoO_2$ constitutes, to great advantage, a negative active material. Nevertheless, theportion of valency which may be used is fairly small, since it corresponds to the variation between $MoO_2$ and $MoO_{2.17}$ in discharge, or in an equivalent way, between $6MoO_2$ and $MoO_3.5MoO_2$ which would bring into play two valencies for six atoms of molybdenum. In other words, that oxidation-reduction system could be defined by the fact that there would be a single mole of $MoO_2$ becoming oxidized firstly in the state $MoO_3$ and being reduced subsequently to the state $MoO_2$ for a group of 6 moles of $MoO_2$ originally brought into play.

Now, it has been observed that the system varying along the step whose potential is approximately −500 mV is not entirely reversible in certain experimental conditions; this step should correspond to the theoretical oxidation-reduction system $MoO_{2.17}/MoO_3$ whose length is theoretically about five times more 3−2.7/2.-17−2 =0.83/0.17 ~ 5) than that of the oxidation-reduction step $MoO_2/MoO_{217}$, the latter system operating in a reversible way.

Within the scope of the invention, it is therefore possible for the negative active material to vary at least between a mixed oxide having an average structure represented by $MoO_{2.17}$ and molybdenum trioxide $MoO_3$.

In a preferred embodiment, it varies between $MoO_2$ and $MoO_3$.

The storage cell which uses this active substance is to great advantage, characterized in that the negative active material is arranged so that it does not disintegrate or scatter during operation.

In a preferred embodiment of the storage cell, the negative active substance, previously compressed, is held tight between a current collector and a porous separator.

That collector, having the shape of a hollow cylinder may surround the active substance on the outside, or else, having the shape of a rod, be arranged in the center of the storage cell.

In another preferred embodiment of the storage cell, the negative active material is acomodated in receptacles having walls which are both mechanically and chemically resistant with respect to the electrolyte, these walls being porous or formed with holes.

These receptacles may be constituted, as in the lead type storage cell technique, by tubes.

According to yet another variant, the negative active material is accommodated in the pores of a porous carbonaceous support constituted by porous graphite or a fabric made of woven or felted graphite fibres.

As in the conventional technique of led storage cells, the negative electrode may comprise an electronically conductive body such as graphite, soot or a mixture of these latter, in powdered form or in the form of graphite fibres.

In the storage cell according to the present invention, highly concentrated sulphuric acid solutions whose density is more than 1.35 and is preferably equal to 1.40 are preferably used as the electrolyte.

It must be stated that the limits assigned to the various oxide reducing systems must not be taken as absolute values, but must be considered as references enabling the various ranges to be defined, these ranges being, moreover, perfectly determined by the corresponding oxidation-reduction potentials. These potentials, measured in relation to a mercury sulphate $Hg/Hb_2SO_4/SO_4^{2-}$ electrode, have, more precisely, a value of −0.78 for the system $MoO_2/MoO_{2.17}$ and 0.40 volts for the system $MoO_{2.17}/MoO_3$. It should be observed that the slight difference between the oxidation-reduction potentials found for the system $MoO_{2.17}/MoO_3$ is due, at least partly, to the ohmic resistance of the electrode, which decreases when the particles are agglomerated more tightly.

According to an applicatoin of the invention constituting a particular advantage, an electrode is formed basically containing the above-mentioned active material, incorporating therein a conductive body having a suitable shape and possibly adding thereto a binding agent basically containing a synthetic resin. The conductive body may be constituted by graphite, soot or a mixture of these latter or by metallic powders such as powders of silver and copper (preferably silver-coated) or even by titanium nitride.

The synthetic resins which may be used as a binding agent are those which are generally used for that purpose, such as, for example, polytetrafluorethylene, polyethylene, polystyrene, etc.

In one embodiment, the electrode is constituted by a mixture of molybdenum trioxide $MoO_3$ and by a suitable conductor in the divided state, to which may be added, to great advantage, a binding agent, the mixture being compressed round or on an electronic conductor constituting the current collector.

The other characteristics of the present invention will be disclosed in the following text with reference to the accompanying figures. This text comprises also the description of the embodiments as well as the results obtained.

Figure 6:
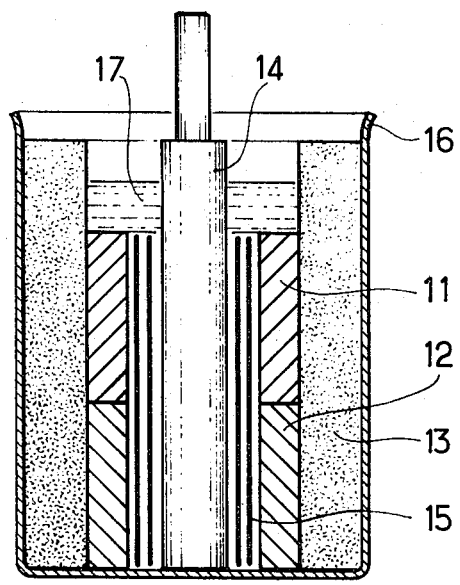
FIG. 6 shows a diagrammatic cross-section view of an embodiment of a storage cell according the the invention, in which the disintegration of the negative electrode is prevented.
Figure 7:
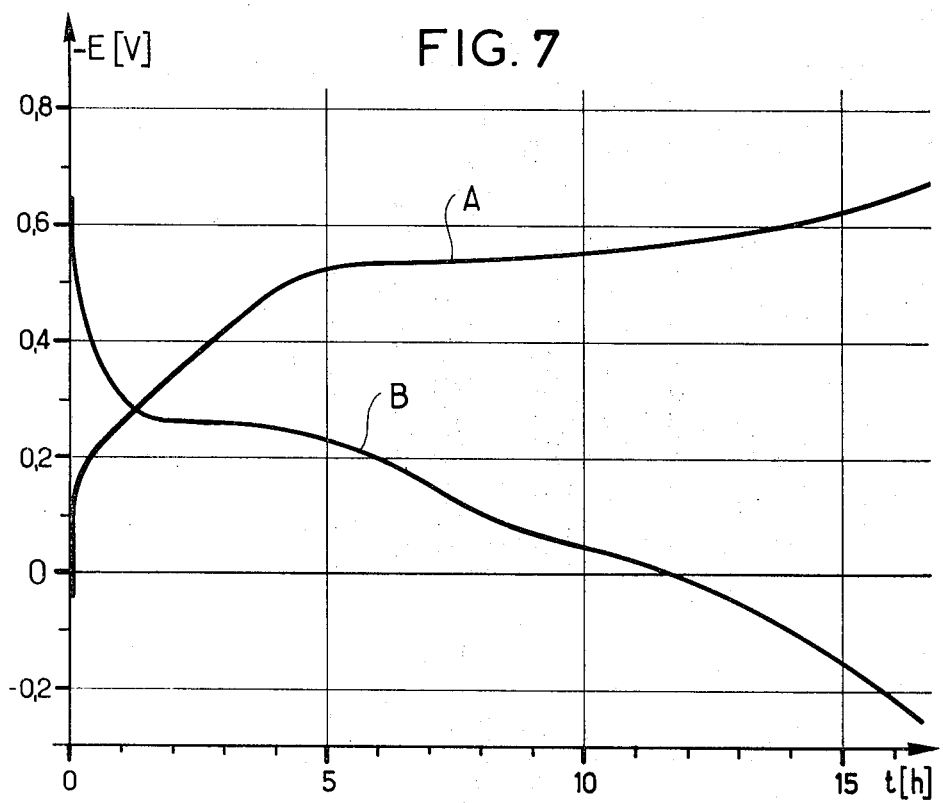

FIG. 7 shows the charge and discharge curve at the fourth cycle of a storage cell according to the invention as in FIG. 6. The charge and discharge have been effected at a constant current equal to 200 mA, this corresponding to a current density equal to 10 mA/squ.cm. of negative electrode. The potential in relation to a mercury sulphate reference electrode is shown in the ordinates and the discharge time in hours is shown in the abscissae.

Figure 8:
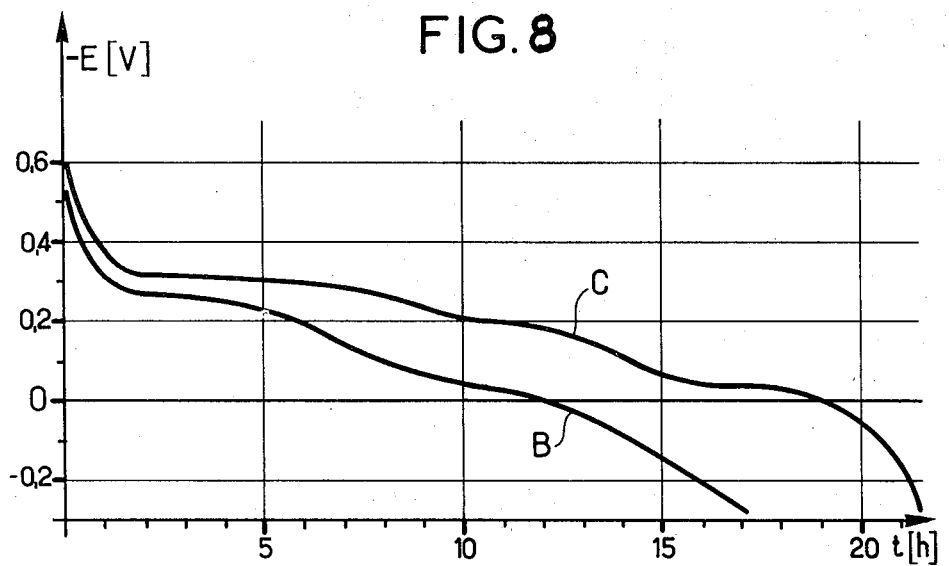

FIG. 8 shows a discharge (the potential in relation to the mercury sulphate is shown in the ordinates and the discharge time in hours is shown in the abscissae). The curve B corresponds to an electrolyte having a density of 1.20, as in FIG. 7. The curve C shows the discharge of an identical storage cell whose electrolyte has a density equal to 1.40.

Figure 9:
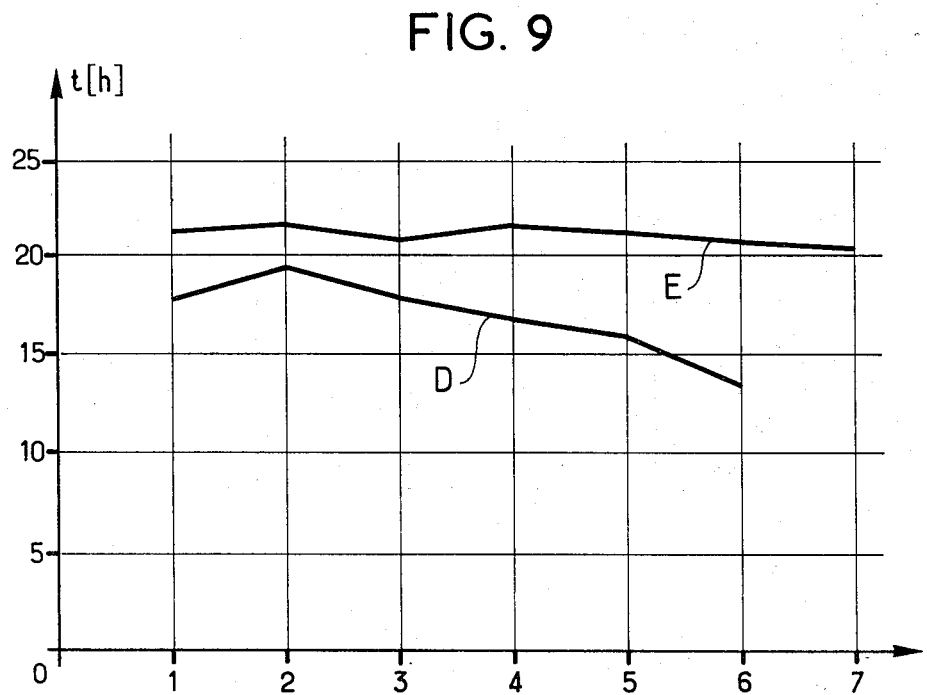

FIG. 9 shows the reaction or performance during the cycle operation of the two storage cells whose fourth discharge has been shown in FIG. 8. The number of cycles has been plotted in the absissae and the duration of discharge has been plotted in the ordinates. The curve D is relative to the elctrolyte whose density is 1.20 and the curved E is relative to the electrolyte whose density is 1.40 The discharge rate, which is the same in both cases, is equal to 200 mA.

Figure 10:
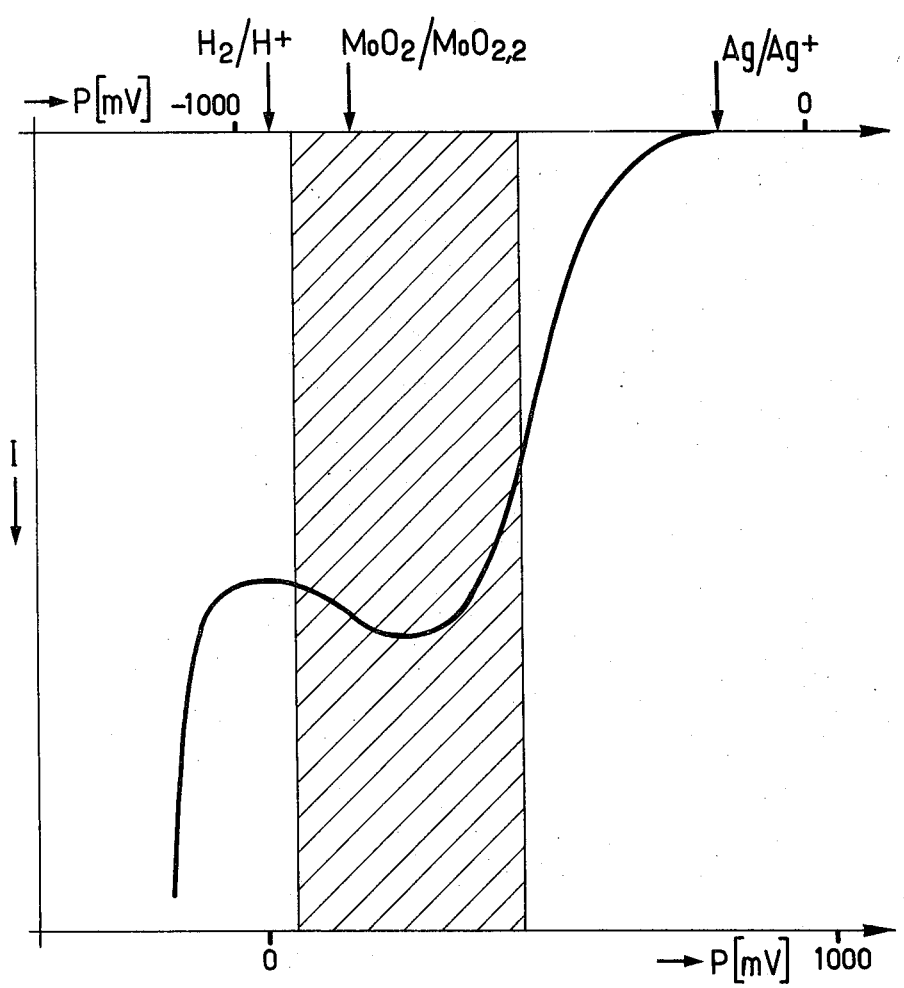

FIG. 10 shows a current-to-potential diagram representing the curves relating to oxygen reduction on silver-coated graphite.

Figure 11:
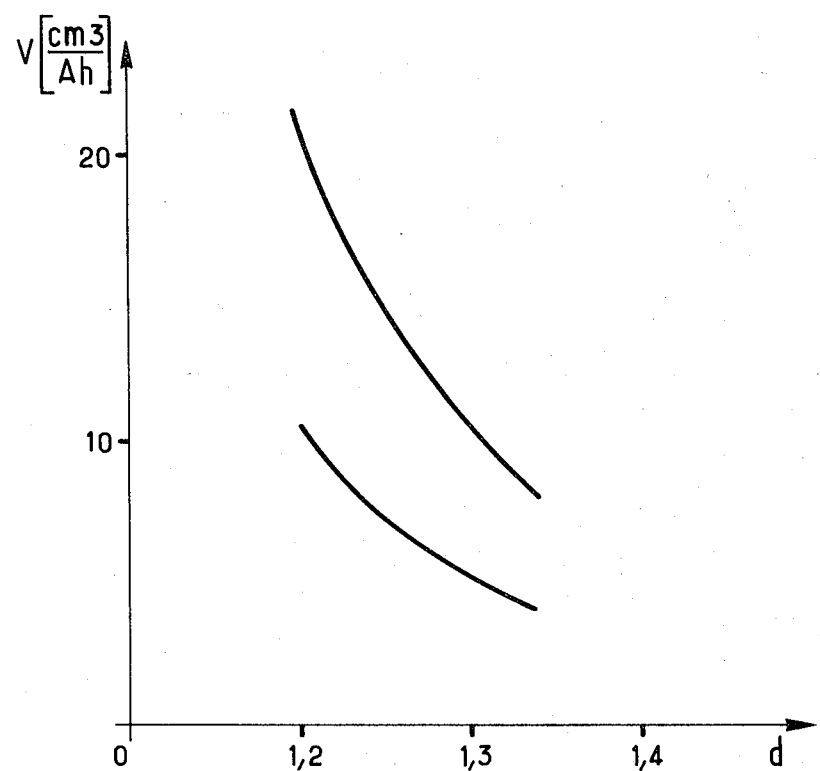

FIG. 11 shows the minimum volume of acid electrolyte per Ah necessary for the operation of conventional lead type storage cells and storage cells according to the invention as a fonction of the original density of the electrolyte.

DETAILED DESCRIPTION

The fundamental experiment leading to the storage cell according to the invention is given here below.

An electrode is formed starting with 77 percent by weight of very pure molybdenum trioxide $MoO_3$ which is mixed with 8 percent of graphite, by weight and 15 percent of polytetrafluorethylene by weight. This mixture is compressed on a gold-plated tantalum support, the compression being in the order of 2 metric tons/squ.cm.

The electrode in question is in the form of a disk having a diameter of 27 mm and the mass weight is 2.60 g.this coresponding to 2 g of molybdenum trioxide. The weight of the gold-plated tantalum support is 0.35 g.

Figure 1:
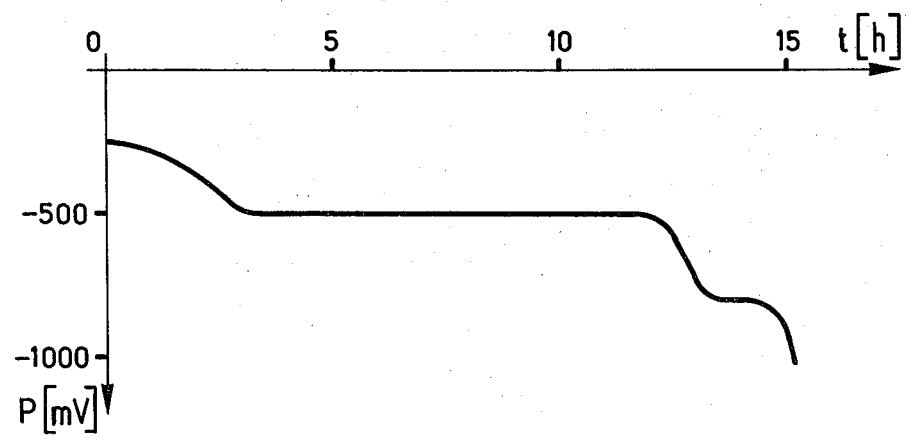
FIG. 1 shows the successive stages in the electrochemical reduction of molybdenum trioxide in a sulphuric acid solution.

That electrode has been subjected to electrochemical forming by cathodic polarization in sulphuric acid solution having a density of 1.20 between two lead counter-electrodes, for a current density equal to 5mA/squ.cm. The variation in the potential of that electrode in relation to a mercury sulphate $Hg/Hg_2SO_4/SO_4^{2-}$ reference electrode is given in FIG. 1. It will be noted, in that figure, that there is firstly a long reduction step at the potential of about −500 mV in relation to the reference electrode. Then, there is another shorter reduction step, at the potential of about −800 mV. When that second reduction stage is ended, that in which hydrogen is given off is begun, starting to take effect at the potential of about − 1000 mV. That electrode thus formed is then subjected to anodic biasing until oxygen is given off, then to cathodic biasing, etc.

Figure 2:
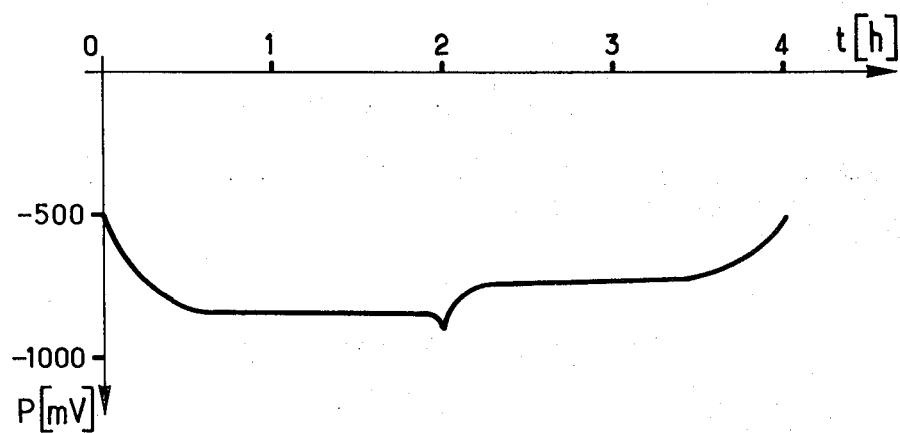
FIG. 2 shows a charging and discharging cycle of the negative active substance according to the present invention.

It has then been observed that the first step at the potential of about −500 mV is not entirely reversible in the experimental conditions adopted, since its length decreases very greatly. On the other hand, the stage at the potential of about −800 mV is reversible, so that its length remains practically constant during the cycle operation. FIG. 2 shows the charge and discharge curves at that step, as a function of the time in hours, obtained at the fifth cycle, at the rate of 5mA/squ.cm. It will be observed that the average charge potential is in the order of −750 mV. The result of this is that the corresponding oxidation-reduction potential lies at about −800 mV. It will be observed also that the duration of the discharge is practically equal to that of the charge.

Figure 3:
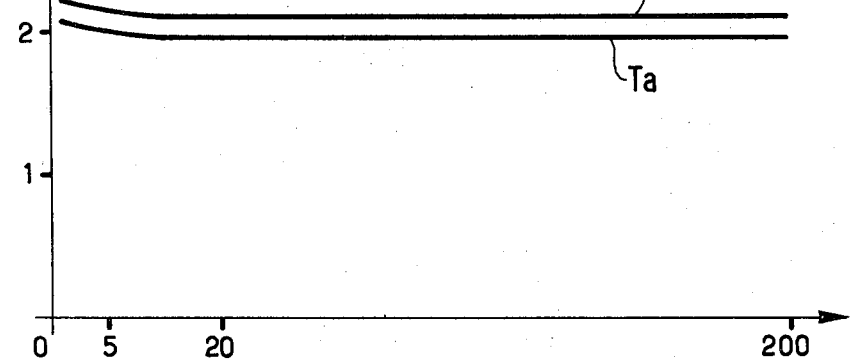
FIG. 3 shows the variation in the capacity restored by the negative electrode according to the invention as a function of the number of charging and discharging cycles.

That electrode has been subjected to the charge and discharge cycles consisting in stoping the charge at a potential of −900 mV and in stopping the discharge at a potential of −550 mV. That electrode was thus able to effect more than 200 cycles keepingup its excellent charge efficiency, that is, the charge duration was kept practically at 2 hours, within a few minutes. Thus, the capacity-to-mass ratio obtained varied only by 2 mAh/g approximately, passing from 57 mAh per gramme at the fifth cycle to 55mAh per gramme of trioxide at the 200th cycle. FIG. 3 gives the variation rate of the capacity as a function of the number of charge (2 hours) and dischage (practically 2 hours) cycles for two different electrodes : the lower curve corresponds to an electrode with a conductive gold-plated tantalum support, whereas the upper curve corresponds to an electrode with an expanded silver support. Indeed, an improvement in the order of 10 percent will be observed when a conductive expanded silver electrode support is used instead of a gold-plated tantalum electrode support. The corresponding negative electrode comprising the same mass (77 % of molybdenum trioxide, 8 percent of graphite and 15 percent of binding agent) thus gave 62–3 mAh per gramme of trioxide after 225 charge and discharge cycles instead of 55 mAh when the electrode support was made of gold-plated tantalum. The corresponding theoretical capacity is equal to 74.5 mAh per gramme of trioxide. The corresponding outputs are respectively equal to 73 and 84 percent according to whether the conductive support is made of gold-plated tantalum or expanded silver.

The final term of the reduction during the electrochemical forming of the electrode, starting from hexavalent molybdenum ($MoO_3$), is a molybdenum oxide in the form of $MoO_m$. If the oxide formed at the stage −500 mV during the reducing of the molybdenum troxide has the form $MoO_n$ where $m<n<3$, the stage at about −800mV would correspond to the oxidation-reduction system $MoO_m/MoO_n$. It has been found, on counting up the coulombs brought into play during the total reducing of the molybdenum trioxide according to FIG. 1 and taking into account the fact that no presence of a soluble molybdenum compound has been detected in the electrolyte during that reduction, that it may be assumed that $m = 2$ and $n = 2.2$. This thus defines the oxide reducing system $MoO_2=MoO_{2.2}$ whose reaction may be represented by equation (4).

If the relation (4) (negative electrode) is combined with the relation (1) (Positive electrode), the characteristic of the operation of the couple $PbO_2/H_2SO_4/MoO_2$ is found.

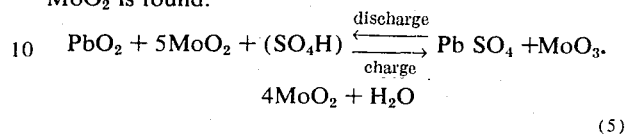

$$PbO_2 + 5MoO_2 + (SO_4H) \underset{\text{charge}}{\overset{\text{discharge}}{\rightleftarrows}} Pb\,SO_4 + MoO_3 \cdot 4MoO_2 + H_2O \qquad (5)$$

On comparing the reactions (3) and (5), it will be observed that the storage cell according to the invention consumes only half the quantity of sulphuric acid necessary for the operation in discharge of the conventional lead type storage cell.

Another advantage of the new active material is that it has a semi-conductor character and this would enable it to be used also without adding thereto an electronically conductive body in the divided state.

On looking for the causes capable of producing the nonreversible operation of an electrode whose negative active material consists basically of molybdenum oxides, when the system $MoO_{2.17}/MoO_3$ was used, it was observed and checked that this operation had its origin in the fact that the electrode in question disintegrated and that its active substance fell to the bottom of the container. A particular way of assembling negative electrodes was then contrived and put into effect. A negative electrode obtained by the usual method of compression is assembled tightly with the separator and the positive electrode. Due to that measure, known for other types of storage cells, the negative active material is held effectively in place during the charge and discharge cycles.

This disentegration phenomenon in the mass of the negative electrode will easily be understood on examining the variations in volume of the active material when it passes from $MoO_3$ (density equal to 4.5) to $MoO_2$ (density equal to 6.47) and vice versa.

That variation in volume is indeed in the order of 40 percent when passing from $MoO_3$ to $MoO_2$ and it is in the order of 50 percent in the reverse direction. It will therefore be seen that if the electrode is constructed in such a way that the contraction phenomena during the charge and expansion phenomena during the discharge of the negative active material may be effected freely, the cohesion between the particles of the negative electrode can no longer be maintained and the electrode is forced to disintegrate. The same occurs in the case of the oxidation-reduction system $MoO_{2.17}/MoO_3$ because the composition of the oxide $MoO_{2.17}$ is quite similar to the composition $MoO_2$. This latter fact explains also the satisfactory reaction of the oxidation-reduction system $MoO_2/MoO_{2.17}$ without any special precautions for maintaining the cohesion of the negative mass.

Nevertheless, the results were still quite unreliable after measures taken to maintain the cohesion of the negative mass when the current collector was in the form of an expanded silver grid which became oxidized and dissolved at the end of discharge, so that the collecting of current provided for by the electrode was affected very poorly. A current collector capable of operating in the acid electrolyte with the new negative active substance along the stage $MoO_{2.17}/MoO_3$ was then sought.

Figure 4:
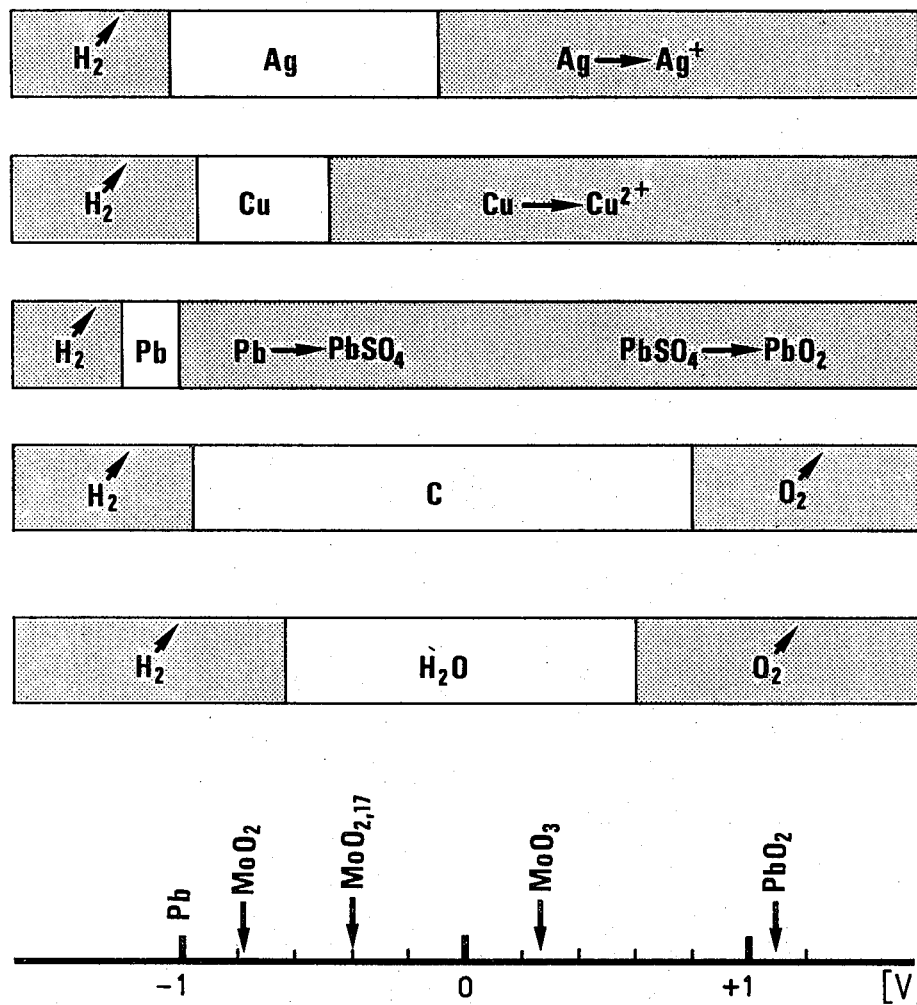
FIG. 4 shows a diagram of the electrochemical behavioux, in an acid medium, of various substances such as silver, copper, lead and carbon in relation with the electrolysis of water, with the oxide reducing systems for the active material and with their corresponding potentials in realtion to a mercury sulphate reference electrode.

FIG. 4 shows the relative position of the various substances generally used which may constitute current collectors and carriers, both inasmuch as concerns the decomposing of water in a medium constituted by a sulphuric acid solution (having here, a density of 1.20) and inasmuch as concerns oxidation-reduction reactions in which the supports may take part. The zone of thermodynamic stability of water in the same medium has also been shown, this enabling the evaluating, if need be, of the over-voltages of hydrogen or oxygen on these various substances.

The following observations are deduced on examining that figure.

Silver, as a support may be perfectly suitable for the system $MoO_2/MoOphd\ 2,17$, but it is insufficient for use for the system $MoO_{2.17}/MoO_3$ because as the silver becomes oxidized and dissolves at the potential of $-0.1$ volt in relation to the mercury sulphate reference electrode, it is not possible to use the whole step of the latter system, that stage slightly exceeding $+0.2$ volts when the, by oxidation in discharge produces the trioxide $MoO_3$,—

Copper has an oxidation-reduction potential which is too electronegative with respect to the system $MoO_{2.17}/MoO_3$ so that it becomes oxidized and dissolved before the forming of $MoO_{2.17}$.

Lead becomes passive by the forming of a lead sulphate layer $PbSO_4$.

On the other hand, carbon may, to great advantage, be used, since by reducing the forming of $MoO_2$ is effected without giving rise to the evolution of hydrogen and that on becoming oxidized, it gives rise to the evolution of oxygen only after the formation of $MoO_3$.

That is why graphite is particularly useful as a substance for the collecter and the electronically conductive body in the divided state intended to make the mass conductive is constituted by carbon in the form of graphite, soot or a mixture of these latter, in powder form.

Figure 5:
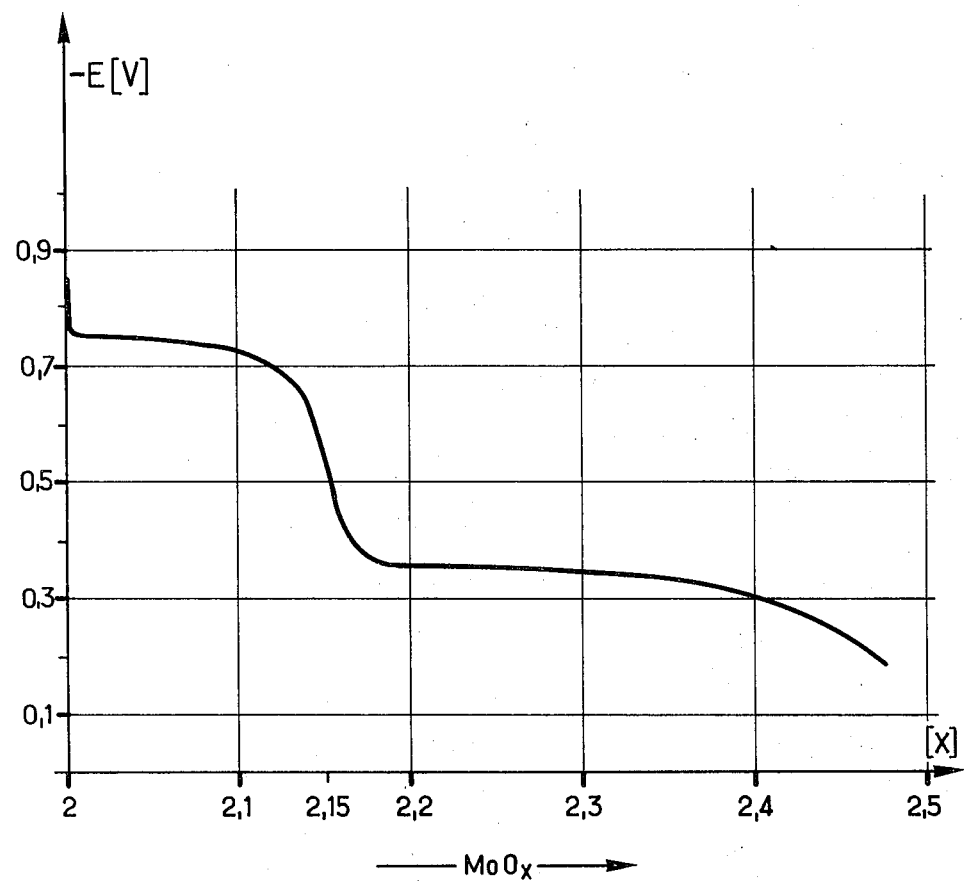
FIG. 5 shows the discharge curve for a negative active material in the charged state, basically consisting of molybdenum dioxide $MoO_2$, whose collector is formed by an expanded silver grid. The potential has been shown in the ordinates and the composition in the form of a coefficient $x$ appearing in the representative formula $MoO_x$, has been shown in the abscissae.

Thus, FIG. 5 gives the discharge of a negative electrode whose negative mass is originally constituted by a mixture composed of 77 percent all by weight of $MoO_3$, 8 percent of graphite and 15 percent of polytetrafluorethylene, that mixture being compressed on an unfolded silver grid under a pressure of two metric tons/squ. cm. that compressed electrode being in the form of a disk having a diameter of 2.7 cm. and a thickness of 0.15 cm. the weight of the mass being equal to 2.60 grammes. The corresponding discharge must be stopped at the potential of $-0.2$ volts to avoid oxidation and the dissolution of the silver support which begins at the potential of $-0.1$ volt. It may be clearly seen that the discharge of the electrode cannot be effected up to the end, so that it cannot give out its full capacity.

Tests make it possible to determined the performance of the negative electrodes containing, as their negative active material, the oxidation-reduction system $MoO_{2.17}/MoO_3$ and taking into account previous teachings.

In another example of embodiment, the composition of the negative mass is slightly modified, increasing the conductive body contents in the divided state so as to improve the conductivity of the electrode : $MoO_3$ 71 percent, graphite 14.5 percent, polytetrafluorethylene 14.5 percent. Rings are manufactured by compressing the above-mentioned mass. Each ring has a height of 2 cm. an inside diameter of 1.5 cm and an outside diameter of 2.3 cm, the weight of the trioxide $MoO_3$ per ring being equal to 7.31 g of pure $MoO_3$, this corresponding to a theoretical capacity of 2.3 Ah for the oxide reducing system $MoO_{2.17}/MoO_3$.

Two such rings 11, 12 are placed in a hollow graphite cylinder 13 fulfilling the function of collector, as shown in FIG. 6. The counter-electrode 14 is constituted by a tube of the "iron clad" type containing lead dioxide. The separator 15 made of a felted propylene fabric surrounding the positive electrode 14 fills all the inter-electrode space having a thickness of 0.4 cm. The assembly thus constituted is placed in a beaker 16 containing a sulphuric acid solution as its electrolyte 17. Two densities, the one equal to 1.20 and the other equal to 1.40, are used.

FIG. 7 shows the charge curve (A) and the discharge curve (B) obtained with an electrolyte whose density is 1.20.

The density of the discharge current for the storage cell in question in which the theoretical capacity of the negative electrode is equal to $2 \times 2.3 = 4.6$ Ah, is taken as equal to 10 mA/Squ. cm., this corresponding to a total discharge current equal to 200 mA. The charge voltage is limited to the potential of $-0.1$ V and the discharge potential is limited to $+0.3$ volts approximately.

The discharge lasting 18.5 hours approximately supplies $0.2 \times 16.5 = 3.3$ Ah whence the operating efficiency of the negative active material, which is equal to $3.3/4.6 = 72$ percent is deduced.

When a sulphuric acid solution having a density of 1.40 instead of 1.20 is used, the results are clearly improved. Thus, FIG. 8 shows the comparative discharge curves, corresponding to the fourth cycle, of two identical storage cells according to FIG. 6, but different from each other by the density of the electrolyte. The discharge concerning the storage cell, in the electrolyte having a density of 1.40 (curve C) should be equal to 2.15 hours, supplying $21.5 \times 0.2 = 4.3$ Ah instead of 16.5 hours in the case of an electrolyte having a density of 1.20 (curve B). The operating efficiency of the negative active material then reaches $4.3/4.6 = 93.5$ percent instead of 72 percent.

FIG. 9 shows the variation in the capacity of these two above-mentioned storage cells when they undergo a few charge and discharge cycles. The curve D corresponds to the electrolyte having a density equal to 1.20. It will be observed that this capacity decreases clearly after a few cycles. On the other hand, the capacity shown by the curve E of the storage cell having an electrolyte whose density is equal to 1.40, is itself throughout time.

It is possible to maintain the cohesion of the negative active substance by other means than that which has been just described, consisting of forming a very close engagement of the electrodes and in maintaining that engagement by means of a non deformable casing, for example, in the form of a graphite tube.

It is possible to accommodate the negative active substance in tubes made of plastic material having porous walls or walls perforated, according to a technique which is well-known in the lead type storage cell industry. In that case, it is evidently not necessary to revert to a very close engagement of the electrodes.

The active substance could also be accommodated in the pores of a graphite support, it being possible to give that support a continuous porous graphite structure, for example, in the form of plates or tubes, or a fibrous structure in the form of a felted or woven graphite fiber fabric. The support could be impregnated with an ammoniacal solution of a molybdenum salt which will be decomposed subsequently by heat in order to line the walls of the pores with a layer of molybdenum trioxide. That porous support would have the advantage of avoiding the use of to an electronic conductor in powder form, because it affects, in a statistically homogeneous way, all the negative active material.

Lastly, a negative electrode could be produced by compressing the negative mass round a carbon rod in a similar way to that used in the electric battery industry for manufacturing manganese dioxide electrodes comprising a carbon rod.

Besides the fact that it operates in a perfectly reversible way, the new negative active material has, to great advantage, two very useful characteristics, one of which is essential for producing a sealed storage cell with an acid electrolyte.

This production is subject to the existence of a reversible cycle of oxygen $O_2/H_2O$ in an acid medium, that is, to the possibility of an effective reduction of the oxygen on the negative electrode. That reducing is effected generally in two steps, the first corresponding to the formation of hydrogen peroxide whereas the second consists in reducing the hydrogen peroxide thus formed. This overall oxidation-reduction system $O_2/H_2O$ in an acid medium is as follows:

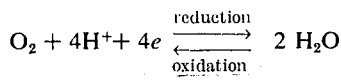

To be able to take place in a significant way, the reduction of oxygen requires above all, a favorable potential and then a suitable catalyst.

The potential must be a little more electropositive than that of the hydrogen $H_2/H^+$ in an acid medium and more electronegative than a certain potential which depends on the nature of the catalyst. This is precisely the case of the negative active material used, whose oxidation-reduction potential is situated at about +200 mV from that of hydrogen, since the oxidation-reduction potential of the $Hg/Hg_2SO_4$ reference electrode iss situated at about +1000 mV from that of hydrogen. The true operating potential of the negative electrode in the storage cell according to the invention varies practically between about + 100 mV/hydrogen at the end of the charge and about +500 mV/hydrogen at the end of the discharge. Now, it happens, moreover, that the active material has a certain conductivity. That electrochemical operating step of the electrode is therefore favorable to the reduction of oxygen on the negative active material due to its semi-conductive character and is compatible with all known catalysts for reducing oxygen in an acid medium.

A concrete case will be described to understand well that aptness of the present negative active material in making the reducing of oxygen on the negative electrode easy. FIG. 10 shows the characteristic current I-potential P curve corresponding to the reduction of oxygen in an acid medium on silvercoated graphite. Two scales of potentials have been illustrated, the lower one in relation to the hydrogen $H_2/H^+$ and the upper one in relation to the mercury sulphate $Hg/Hg_2SO_4$ reference electrode, these two origins of potentials being staggered by a little less than 1000 mV.

The reduction current begins to become apparent at a potential which is more electronegative than that of the system $Ag/Ag^+$ to reach practically a step corresponding to the maximum reducing speed, comprised between the potentials of −400 mV and −1,000mV approximately in relation to the potential of the mercury sulphate electrode. When about −1,000 mV is exceeded, the transformation of $2H^+ + 2e \rightarrow H_2$ corresponding to the evolution of hydrogen is started. A shaded zone which corresponds to the electrochemical operation of the active material of the negative electrode used in a fluid-tight storage cell according to the present invention has been limited on this current-potential diagram. It will be seen that this shaded zone comprises precisely the most effective zone of the potentials for obtaining the maximum reduction of oxygen. This coexistence explains to what extent a negative electrode constitutes an advantage, where the active material has been mixed with an ionically conductive divided body basically consisting of silver-coated graphite.

A second advantage resides in the fact that the negative active material, after having been oxidized during the main discharge corresponding to the oxidation of the system $5MoO_2/MoO_3$. 4 $MoO_2$ along the step of about −800 mV in relation to the mercury sulphate electrode (see FIG. 1) is liable to undergo a further electrochemical oxidation corresponding to the oxidation-reduction system illustrated by the stage of about −500 mV. The latter step has, further, a length or electrochemical capacity sufficient for acting as a safety means during the reversal of the storage cell. That reversal constitutes a serious disadvantage which may always occur in a storage cell battery in which the cells do not all have the same capacity. The cell which has the smallest capacity continues to receive the current imposed by the other storage cells which are not yet discharged flowing through it. It is then said that the storage cell is "reversed." That reversal current may cause, at the electrodes, undesirable secondary reactions giving off gases.

The existence of the extra electrochemical oxidation step for the active material of the negative electrode is liable to generate a signal of about 0.3 volts corresponding to the passing from the step of −800 mV to that of −500 mV. That information may be profitably used to stop the discharge. But the possibility of further electrochemical oxidation which is afforded to the negative active material has the effect of preventing also the starting up of a secondary reaction of oxidation of the water which could generate oxygen.

If measures are taken to set up, on the positive electrode, an auxiliary electrochemical reaction not giving rise to the formation of hydrogen after complete discharge of the positive active material basically consisting of lead dioxide, it will be possible to prolong the oxidation on the negative electrode and the reduction on the positive electrode after the discharge of the storage cell for a sufficiently long time to enable the corresponding storage cells to be reversed without rest of giving off gas. It is possible to set up, for that purpose, on the positive electrode, in a known way, such further electrochemical reactions, either by increasing the capacity of the positive electrode and by pre-charging its excess part, or by inserting therein another oxidation-reduction system, for example, that of the negative active substance itself.

In the first case, the production of a fluid-tight storage cell according to the invention will be effected as follows: Where $C_a$ is the rated capacity of the storage cell, a capacity equal to $(C_a + C_n)$ will be taken as the capacity of the negative electrode, where $C_n$ is the excess capacity which is to remain in the discharged state when the storage cell is completely charged. A capacity equal to $(C_a + C_p)$ will be taken as the capacity of the positive electrode, where $C_p$ is the excess capacity of the positive electrode in the pre-charged state, that is, the excess capacity which is to remain in the charged state when the storage cell is completely discharged. The capacity of the storage cell which has just been defined will therefore be limited by the main chargeable part of the negative electrode.

Due to the existence of the non-chargeable excess material of the negative electrode, that is $C_n$, it is not possible to charge that electrode completely when the storage cell is completely charged, so that the potential for evolving hydrogen on the negative electrode is not reached. The positive electrode then being completely charged (main part and excess part included) oxygen will be evolved which will act as a support for the oxygen cycle in an acid medium during which the oxygen is oxidized at the positive electrode in the state of free oxygen and is reduced at the negative electrode to that state of water. The electrons supplied by the outside source to the negative electrode are then used for reducing the oxygen instead of being used for reducing the excess part $C_n$ of the negative electrode. The charged state of the negative electrode then remains stationary without reaching the potential for giving off hydrogen.

The problem of reversal will have been solved satisfactorily by these measures.

In certain cases, the mere fact that the capacity of the fluid-tight storage cell according to the invention was limited by the chargeable part of the negative electrode which is equal to $C_a$ will be sufficient. The result of this is that at the end of the discharge, there occurs a clear variation in the potential of the negative electrode correlative to the passing from the main discharge step of the negative active substance to the consecutive stage of its higher oxidation, that variation in the potential being equal to 0.3 volts approximately.

That variation in the potential may then be used as information for a regulating system aiming at cutting off the discharge of the storage cell battery where at least one storage cell has been reversed.

In other cases, the reversed storage cell (or possibly the reversed storage cells) may be left with the discharge current supplied by the battery flowing through it until complete discharge of the latter due to the fact that advantage is taken of the further oxidation stage for the negative active material already discharged along the main stage and that use is made of the electrochemical reducing of the part of the positive electrode which has been pre-charged.

The value of that pre-charge must be such that it compensates the inequalities in capacity of the storage cells due to manufacturing causes. It would be sufficient to take the pre-charged part of the positive electrode equal to 10 to 20 percent approximately of the capacity $C_n$ of the storage cell.

This would be done in a similar way if it were necessary to replace the pre-charged part of the positive electrode by a faradic equivalent of an auxiliary oxidation-reduction such as that which may be obtained from a certain quantity of negative active substance.

Although certain arrangements adopted inasmuch as concerns the capacity of electrodes and although the structure of the sealed storage cells in which a molybdenum type negative active material is used according to the invention are not new, the use, according to the invention, of a negative active material which, besides not being corrodable by the electrolyte, is liable to undergo a further electrochemical oxidation, has the effect of making the negative electrode comprise an extra function without reverting to particular extra means which are well-known in themselves, consisting in adding to the negative electrode an antipolar mass in the form of the positive active substance with a view to obtaining the same protective effect.

As the electrolyte, sulphuric acid solutions having original densities comprised preferably between 1.20 and 1.35 are used, like in conventional lead type storage batteries. It has indeed been observed that electrolytes whose density exceeds 1.40 do not allow the negative active material basically consisting of lower oxides of molybdenum to supply its full electrochemical capacity. On the other hand, densities lower than 1.20 do not offer a great advantage, for they lead to conductivities of the electrolyte which are too slight at the end of the discharge because of the consumption of sulphuric acid by the positive active material during the charge.

It is also an advantage to use separators of the felted type having fibres which cannot be corroded by the electrolyte. This type of separator enables, indeed, easier ionic exchanges and easier transport of oxygen by diffusion. Glass fibers, polypropylene fibres, fibres made of acrylonitrile and polyvinyl chloride copolymer, etc., may be used for that purpose.

The negative electrode according to the present invention therefore, has the following advantages:

It operates in a reversible way with very high efficiency;

It has, for itself, a certain conductivity which would enable it to operate possibly without the addition of an electronic conductor in the divided state when operating at low rate;

As it does not contain any lead as the carrier or in the active material state, it is free from passivating phenomena due to the forming of lead sulphate, which constitute a very serious disadvantage for negative lead electrodes;

It does not pass through the sulphate stage in the discharged state, so that the discharge thereof, is effected without correlative consumption of sulphuric acid. The result of this is an economy in the quantity of sulphuric acid used, hence the improvement, moreover, of the mass-to-efficiency and volume-to-efficiency ratios for the corresponding storage cells.

In order to have an idea of the greatness of that economy, the practical minimum quantity of electrolyte per Ah of capacity should be determined taking as an example a $PbO_2/H_2SO_4/Pb$ storage cell in accordance with the relation (3) and a $PbO_2/H_2/SO_4/MoO_2$ storage cell in accordance with the relation (5). In the first case, during the discharge, for a capacity of 2 faradays, 2 moles of sulphuric acid are consumed and 2 moles of water are formed, whereas in the second case, these quantities are reduced respectively by half. It may be admitted that the electrolyte must still be sufficiently conductive at the end of the discharge when it is at the maximum of its dilution, this imposing a minimum of density. An acceptable limiting final density of the electrolyte in practice would be 1.1. this corresponding to 150 g/l of sulphuric acid, having a conductivity of $0.6^{-1}$ $cm^{-1}$. For a smaller final density, the conductivity would fall to a non-permissible value.

If V is the original volume of the electrolyte end $d_i$ is its original density, the calculation gives, taking into account the depletion in acid and the enriching in water which have just been specified.

$V = (321.15/167d_i - 185.2)$ by the system $PbO_2/H_2SO_4/Pb$ $V = (160.58/167d_i - 185.2)$ by the system $PbO_2/H_2SO_4/MoO_2$.

FIG. 11 shows the corresponding values of the volume in the example where sulphuric acid solutions having an original density varying between 1.2 and 1.35 are used. It will be seen that, for an original density of 1.20, the minimum volume of electrolyte for the conventional lead type storage cell is the order of 20 cc whereas it is only in about 10 cc for the storage cell according to the present invention, hence an economy of 10 cc of electrolyte per Ah, or 12 g in weight, which, for a 100 Ah storage cell, would make an economy of one litre of electrolyte a 1,200 g in weight.

The zone between the two curves defines therefore the economy of electrolyte brought about by the present invention.

It must be understood that equivalent features may be introduced in manufacturing electrodes from the negative active material basically consisting of molybdenum, obtained according to the present invention. The quantity of the electronic conductor in the divided state may be reduced and even dispensed with according to the operating state which is required to be applied. It is also possible to reduce the quantity of binding agent, increasing correlatively the compression. The binder may even be dispensed with when the conductive body in the divided state has felt promoting qualities which enable coherent electrodes to be obtained by simple compression.

What is claimed is:

1. Storage cell comprising an acid electrolyte, a positive electrode constituted by the electrochemical system $PbO_2/H_2SO_4/PbSO_4$ and a negative electrode having active negative material that varies between the charged state and the discharged state in the form of oxides which are insoluble in the acid electrolyte, these oxides being selected from the group consisting of simple and mixed molybdenum oxides such that the average value of the valency of the oxide ranges from greater than or equal to four and less than or equal to six.

2. Storage cell according to claim 1, characterized in that said active material varies between a mixed oxide having the structure represented by $MoO_{2.17}$ and molybdenum trioxide $MoO_3$.

3. Storage cell according to claim 1, characterized in that said active material varies between molybdenum dioxide and molybdenum trioxide $MoO_3$.

4. Storage cell according to claim 1, characterized in that the average value of the valency of the molybdenum as the oxide varies, from 4, when the oxide is in the most reduced state, that is, in the charged state, the corresponding composition being illustrated by $MoO_2$, to a value comprised between 4⅓ and 4½ corresponding to the oxide in the most oxidized state, that is, in the discharged state, these oxide limits being illustrated respectively by the formulas $MoO_3.5MoO_2$ and $MoO_3.3MoO_2$.

5. Storage cell according to claim 1, characterized in that the average value of the valency of the molybdenum in the mixed oxide corresponding to the active material in the discharged state is equal to 4.4, this being illustrated by the formula $MoO_3.4MoO_2$.

6. Storage cell according to claim 5, characterized in that said negative active material corresponds to the oxidation-reduction system

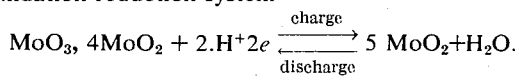

$$MoO_3, 4MoO_2 + 2.H^+ 2e \underset{\text{discharge}}{\overset{\text{charge}}{\rightleftharpoons}} 5\ MoO_2 + H_2O.$$

7. Storage cell according to claim 1 wherein said negative electrode basically consists of said negative active material characterized further in that said negative electrode comprises, moreover, an electronically conductive body, in the divided state which cannot be corroded by said electrolyte.

8. Storage cell according to claim 7, characterized in that the conductive body is selected from the group consisting of silver-coated graphite, soot, mixtures of graphite and soot, metallic powders selected from the group consisting of silver powder, copper powder, silver-coated copper powder and titanium nitride powder.

9. Storage cell according to claim 1 wherein said negative electrode basically consists of said negative active material characterized further in that said negative electrode comprises an electronically conductive support for said material constituting a current collector which cannot be corroded by said electrolyte.

10. Storage cell according to claim 7 characterized in that said body comprises an electronically conductive support constituting a current collector which cannot be corroded by the electrolyte.

11. Storage cell according to claim 10 characterized in that the support comprises either a grid, a sheet formed with holes or a porous substance.

12. Storage cell according to claim 10 characterized in that said support is for negative active material and comprises containers having walls which are both mechanically resistant and chemically resistant with respect to said electrolyte, said walls being perforate.

13. Storage cell according to claim 12, characterized in that said containers comprise tubes.

14. Storage cell according to claim 11, characterized in that said support is constituted by graphite.

15. Storage cell according to claim 10, characterized in that the support is constituted by carbon fibres.

16. Negative electrode according to claim 11, characterized in that the electronically conductive support is metallic and selected from the group consisting of tantalum, silver, silver-coated lead and gilt lead.

17. Storage cell according to claim 1, wherein said negative electrode basically consists of said negative active material and comprises moreover a binding agent basically consisting of a synthetic resin.

18. Storage cell according to claim 7 characterized in that said negative electrode comprises, moreover, a binder for said negative active material basically consisting of a synthetic resin.

19. Storage cell according to claim 17 characterized in that the synthetic resin is selected from the group consisting of polytetrafluorethylene, polyethylene and polystyrene.

20. Lead acid storage cell comprising a positive active material basically consisting of lead, an acid electrolyte in a porous separator, and a negative active material, characterized in that the negative active material is composed of oxides insoluble in the active electrolyte according to claim 1, together with an electronically constructed body which cannot be corroded by the electrolyte, said oxides and body forming a negative electrode for said cell.

21. Storage cell according to claim 20, characterized in that said body serves as the current collector and that the negative active material, previously compressed, is held tightly between aid current collector and said porous separator.

22. Storage cell according to claim 21, characterized in that the negative active material is compressed into a practically ring-like annular form, said current collector being located on the inside surface of said form.

23. Storage cell according to claim 21, characterized in that said current collector is in the form of a rod and said negative active substance is compressed around said rod.

24. Storage cell according to claim 20 characterized in that said electrolyte is constituted by a sulphuric acid solution whose density is greater than 1.35 and is preferably equal to 1.40.

25. Storage cell according to claim 20 characterized in that the negative active material, after having been oxidized during cell discharge, is liable to undergo an extra oxidation corresponding to the oxidation-reduction system whose potential is equal to about −500 mV in relation to a mercury sulphate reference electrode.

26. Storage cell according to claim 25 characterized in that the voltage variation when the negative active material passes from the main oxidation stage, corresponding to discharge, to the extra oxidation stage, is used for stopping its discharge.

27. Storage cell according to claim 20 characterized in that said positive active material comprises a precharged portion.

28. Storage cell according to claim 20, characterized in that cell capacity is equal to the chargeable capacity of said negative electrode.

29. Storage cell according to claim 20, characterized in that a further electrochemical system whose oxidation-reduction potential is less than that of said positive active material, is added to the positive electrode, a further electrochemical system being that formed by said negative active substance.

30. Lead acid storage cell comprising a porous separator, an acid electrolyte in said separator, a positive electrode having active material constituted by the electrochemical 31. system $PbO_2/H_2SO_4/Pb5O_4$, a negative electrode containing negative active material characterized in that said negative active material varies between the charged state and the discharged state in the form of oxides insoluble in the said acid electrolyte, said oxides being selected from the group consisting of simple and mixed molybdenum oxides such that the average value of the valency of the oxides ranges from greater than or equal to four and less than or equal to six and an electronically conductive body which cannot be corroded by the electrolyte, said oxides and body forming said negative electrode for said cell.

* * * * *